US009069769B2

(12) United States Patent
Vandervort et al.

(10) Patent No.: US 9,069,769 B2
(45) Date of Patent: Jun. 30, 2015

(54) CREATING OR MODIFYING AN ORDERED TRAIL OF LINKS TO PAGES AND/OR DOCUMENTS

(75) Inventors: David Russell Vandervort, Walworth, NY (US); Jesse Silverstein, Jersey City, NJ (US); Zahra Langford, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 475 days.

(21) Appl. No.: 13/242,762

(22) Filed: Sep. 23, 2011

(65) Prior Publication Data

US 2013/0080867 A1    Mar. 28, 2013

(51) Int. Cl.
*G06F 17/00* (2006.01)
*G06F 17/30* (2006.01)

(52) U.S. Cl.
CPC ...... *G06F 17/30014* (2013.01); *G06F 17/3089* (2013.01); *G06F 17/30011* (2013.01); *G06F 17/30876* (2013.01)

(58) Field of Classification Search
CPC ............... G06F 17/30873; G06F 17/30011; G06F 17/30722; G06F 17/30876; G06F 17/3089; G06F 17/30864
USPC ......................................... 715/202, 205, 209
See application file for complete search history.

(56) References Cited

U.S. PATENT DOCUMENTS

| | | | |
|---|---|---|---|
| 6,557,015 B1* | 4/2003 | Bates et al. | 715/229 |
| 2003/0005053 A1* | 1/2003 | Novaes | 709/204 |
| 2006/0253586 A1* | 11/2006 | Woods | 709/226 |
| 2007/0106952 A1* | 5/2007 | Matas et al. | 715/764 |
| 2008/0306937 A1* | 12/2008 | Whilte et al. | 707/5 |
| 2010/0241940 A1 | 9/2010 | Rao et al. | |
| 2010/0241951 A1 | 9/2010 | Vandervort et al. | |

OTHER PUBLICATIONS

MacManus, Richard; "What is the Memex? Xerox Presents Trailmeme," published on Dec. 6, 2009, 4 pages.*
Byrne, Richard; "Free Technology for Teachers, Trailmeme—Create and Trace Trails of Links," published on Sep. 15, 2010, 5 pages.*
"Introduction to Trailmeme," YouTube video at http://youtu.be/ofArVKb58-Q; author unknown; uploaded by Xeroxtrails on Mar. 18, 2010, 3 pages.*
Lardinois, Frederic; "Collect, Process and Share Your Online Research with Trailmeme," published on Sep. 13, 2010, 5 pages.*

(Continued)

*Primary Examiner* — Kavita Padmanabhan
*Assistant Examiner* — Ariel Mercado
(74) *Attorney, Agent, or Firm* — Fay Sharpe LLP

(57) ABSTRACT

A method of managing an aggregate document includes a) presenting management options on a display device associated with a computing device in response to a user using the computing device to identify or select an aggregate document to be created of modified, b) presenting search selection options on the display device in response to the user selecting an embedded search service from a plurality of choices of embedded services, c) presenting a search result list on the display device after the user entered one or more search terms in a search text box and activated a search control and in response to receiving search results from a corresponding search conducted by the search engine, and d) adding a media content record to the aggregate document in response to the user activating an add control associated with a corresponding search result item.

20 Claims, 16 Drawing Sheets

(56) References Cited

OTHER PUBLICATIONS

Trailmeme—Frequently Asked Questions, Xerox Corporation, 2011, printed from http://trailmeme.com/faq on Sep. 1, 2011 (4 pages).

Maurer, Hyper-G (now)—Hyperwave: The Next Generation Web Solution, Addison Wesley Publishing Company, Apr. 1996, front matter, Contents pp. (xi-xvii), Chapter 9 (pp. 103-114), and Chapter 15 (pp. 193-234).

About Diigo, 2011, printed from http://www.diigo.com/about on Sep. 13, 2011 (3 pages).

BLOG.reddit, How reddit works, The Reddit Blog, Sep. 2, 2011, printed from http://blog.reddit.com/2011/09/how-reddit-works.html on Sep. 13, 2011 (6 pages).

Wikipedia:About, Wikipedia—the free encyclopedia, Wikimedia Foundation, Inc., Sep. 1, 2011, printed from http://en/wikipedia.org/wiki/Wikipedia:About on Sep. 13, 2011 (14 pages).

Trailmeme—Overview, published by Xerox Corporation, 2011, printed from http://trailmeme.com/info/overview on Sep. 1, 2011 (2 pages).

Xerox Brochure No. 610P729838, Xerox DocuShare 6.5—Share, Search, Automate, Save, published by Xerox Corporation, 2009 (4 pages).

What is Digg?, published by Digg, Inc., 2011, printed from http://about.digg.com/about on Sep. 13, 2011 (3 pages).

\* cited by examiner

CREATING OR MODIFYING AN ORDERED TRAIL OF LINKS TO PAGES AND/OR DOCUMENTS

BACKGROUND

The present exemplary embodiment relates generally to a method of managing an aggregate document. It finds particular application in presenting management options on a display device associated with a computing device in response to a user using the computing device to identify or select an aggregate document to be created or managed. The management options include a plurality of choices of embedded services for adding media content resources to a trail defined by the aggregate document. In various embodiments, the embedded services include an embedded search service. However, it is to be appreciated that the exemplary embedded services described herein are re-configurable and can also include an embedded manual service, an embedded resource repository (e.g., marker list) service, another embedded search service, or other suitable types of embedded services in any suitable combination.

Trails, also known as aggregate documents, are collections of resources, such as Word documents and web pages, bound together by a logical structure that can be easily navigated using a web browser. Creating a trail is a painstaking process of locating each individual resource and inserting it into a trail creation user interface by copying and pasting a uniform resource locator (URL) and typing metadata (e.g., title and description) or a similar manual means. Organizing the resources is another step that usually involves moving and linking elements of the trail manually. Many users find this process unacceptably slow while others find learning the method so difficult that they abandon the effort to create a trail.

INCORPORATION BY REFERENCE

The following documents are fully incorporated herein by reference: 1) U.S. Pat. App. Publication No. 2010/0241940 to Rao et al., Ser. No. 12/408,397, filed Mar. 20, 2009; 2) U.S. Pat. App. Publication No. 2010/0241951 to Vandervort et al., Ser. No. 12/408,431, filed Mar. 20, 2009; 3) Trailmeme—Overview, Xerox Corporation, 2011, printed from http://trailmeme.com/info/overview on Sep. 1, 2011 (2 pages); 4) Trailmeme—Frequently Asked Questions, Xerox Corporation, 2011, printed from http://trailmeme.com/faq on Sep. 1, 2011 (4 pages); 5) Maurer, Hyper-G (now)—Hyperwave: The Next Generation Web Solution, Addison Wesley Publishing Company, April 1996; and 6) Xerox Brochure No. 610P729838, XEROX® DOCUSHARE® 6.5—Share, Search, Automate, Save, Xerox Corporation, 2009 (4 pages). XEROX® and DOCUSHARE® are registered trademarks of Xerox Corporation, Norwalk, Conn.

BRIEF DESCRIPTION

In one aspect, a method of managing an aggregate document is provided. In one embodiment, the method includes: a) presenting management options on a display device associated with a computing device in response to a user using the computing device to identify an aggregate document to be created, wherein the aggregate document is adapted to store a plurality of media content records and interconnecting relationships that define a trail for navigating through a corresponding plurality of media content resources using the interconnecting relationships and hyperlinks to the media content resources, wherein the management options include a plurality of choices of embedded services for adding media content resources to the trail defined by the aggregate document, b) presenting search selection options on the display device in response to the user selecting a first embedded search service from the plurality of choices of embedded services, wherein the search selection options include a search text box for selective entry of one or more search terms by the user and a search control for activation of a search by a first search engine in relation to coinciding content of the search text box, c) presenting a search result list on the display device after the user entered one or more search terms in the search text box and activated the search control and in response to receiving search results from a corresponding search conducted by the first search engine, wherein the search result list includes a plurality of search result items and an add control associated with each search result item, and d) adding a first media content record to the aggregate document in response to the user activating the add control associated with a corresponding first search result item, wherein the first media content record includes a first hyperlink for a first media content resource corresponding to the first search result item.

In another embodiment, the method of managing an aggregate document includes: a) presenting management options on a display device associated with a computing device in response to a user using the computing device to select an aggregate document to be modified, wherein the aggregate document stores a plurality of media content records and interconnecting relationships that define a trail for navigating through a corresponding plurality of media content resources using the interconnecting relationships and hyperlinks to the media content resources, wherein the management options include a plurality of choices of embedded services for adding media content resources to the trail defined by the aggregate document, b) presenting search selection options on the display device in response to the user selecting an embedded search service from the plurality of choices of embedded services, wherein the search selection options include a search text box for selective entry of one or more search terms by the user and a search control for activation of a search by a search engine in relation to coinciding content of the search text box, c) presenting a search result list on the display device after the user entered one or more search terms in the search text box and activated the search control and in response to receiving search results from a corresponding search conducted by the search engine, wherein the search result list includes a plurality of search result items and an add control associated with each search result item, and d) adding media content records to the aggregate document in response to the user activating the add control associated with corresponding search result items, wherein each added media content record includes a hyperlink for the media content resource corresponding to the added search result item.

In another aspect, a non-transitory computer-readable medium storing program instructions is provided that, when executed by a computer, cause a corresponding computer-controlled device to perform a method of managing an aggregate document. In one embodiment, the method performed by the computer-controlled device includes: a) presenting management options on a display device associated with a computing device in response to a user using the computing device to identify or select an aggregate document to be created or modified, wherein the aggregate document is adapted to store a plurality of media content records and interconnecting relationships that define a trail for navigating through a corresponding plurality of media content resources using the interconnecting relationships and hyperlinks to the media content resources, wherein the management options include a plurality of choices of embedded services for adding media content resources to the trail defined by the aggregate document, b) presenting search selection options on the display device in response to the user selecting a first embedded search service from the plurality of choices of embedded services, wherein the search selection options include a search text box for selective entry of one or more search terms by the user and a search control for activation of a search by a first search engine in relation to coinciding content of the search text box, c) presenting a search result list on the display device after the user entered one or more search terms in the search text box and activated the search control and in response to receiving search results from a corresponding search conducted by the first search engine, wherein the search result list includes a plurality of search result items and an add control associated with each search result item, and d) adding a first media content record to the aggregate document in response to the user activating the add control associated with a corresponding first search result item, wherein the first media content record includes a first hyperlink for a first media content resource corresponding to the first search result item.

BRIEF DESCRIPTION OF THE DRAWINGS

FIG. 2 is an exemplary display screen for management of an aggregate document using an embedded marker list service;

FIG. 3 is an exemplary display screen for management of an aggregate document using an embedded manual service;

FIG. 4 is an exemplary display screen for management of an aggregate document using an embedded search service;

FIG. 5 is another exemplary display screen for management of an aggregate document using an embedded search service;

DETAILED DESCRIPTION

Figure 1:
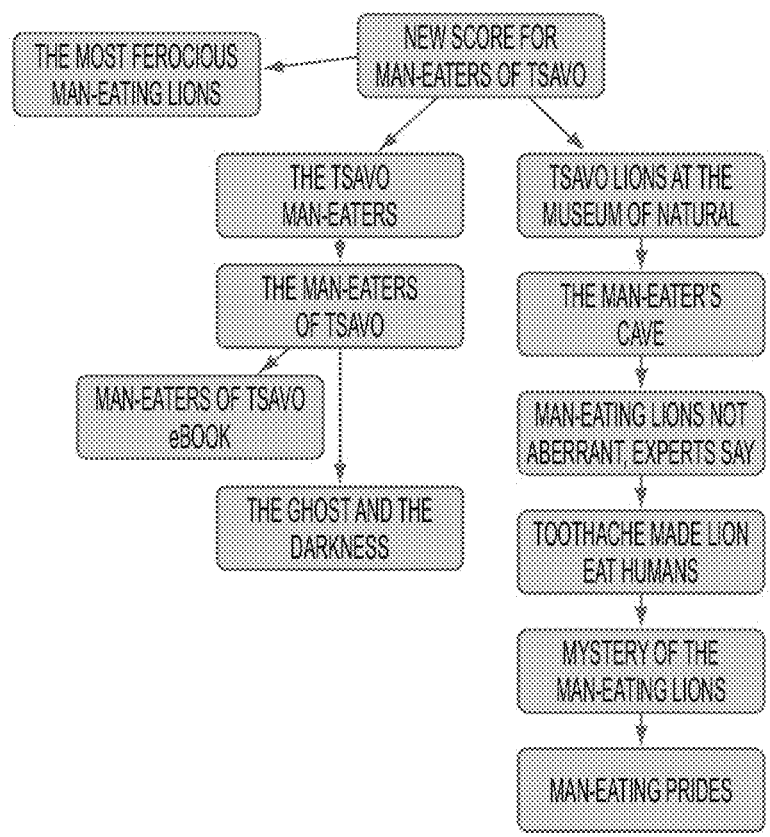
FIG. 1 is a diagram of an exemplary trail map view of an exemplary aggregate document.

This disclosure describes various embodiments of methods of managing an aggregate document. The aggregate document is formed by an electronic file. The electronic file may be any suitable file format. For example, the aggregate document may be formed from a database that includes records for one or more aggregate documents. In other embodiments, the aggregate document may be formed by an .xml (extensible markup language) file, an .html (hypertext markup language) file, a .pdf (portable document file) file, a .doc (document) file, a .docx (xml document) file, or another suitable type of file. The various techniques present management options on a display screen associated with a computing device in response to a user using the computing device to identify or select an aggregate document to be created or managed. The management options include a plurality of choices of embedded services for adding media content resources to a trail defined by the aggregate document. The embedded services are re-configurable and can include an embedded search service, a manual entry service, a resource repository (e.g., marker list) service, an alternate embedded search service, or other suitable types of embedded services in any suitable combination. The media content resources can include text files, image files, audio files, video files, graphics files, multimedia files, web page files, and other type of media content resources in any suitable native file format, including .pdf files, .doc files, .docx files, .jpg (joint photographic experts group) files, .wav (waveform audio file) files, .mpeg (moving picture exerts group) files, .ppt (power point) files, .gif (graphic interchange format) files, .html files, .xml files, etc.

The various embodiments disclosed herein describe a system for providing a user interface to creating and maintaining an aggregate document (i.e., trail) by adding links to subdocuments that may be hosted by multiple sources. For example, the subdocuments may include web pages and other types of documents in native file formats (e.g., .html files, .pdf files, .doc files, or .docx files). The user interface provides access to a variety of techniques for adding documents, including manually entering content data, uploading files, or finding web pages using a search service, such as GOOGLE®, selecting items to be added to the trail, and adding the selected items. The user interface also permits items to be removed from the trail. GOOGLE® is a registered trademark of Google, Inc., Mountain View, Calif.

The services available to the user interface can be re-configured at a user level or a global level. For example, users (or administrators) can substitute a suitable search service (e.g., BING®) for a dedicated or default search service (e.g., GOOGLE®). BING® is a registered trademark of Microsoft Corporation, Redmond, Wash. Users (or administrators) can configure the user interface to offer multiple search services. Any suitable search service can be added or removed from the user interface. For enterprise applications, search services dedicated to particular uses may be added, for example, by an administrator. For example, a law firm might "plug in" a module so that the user interface allows the user to search a legal database (e.g., LEXIS®). LEXIS® is a registered trademark of Reed Elsevier Properties, Inc., Wilmington, Del.

The techniques for adding subdocuments to an aggregate document via the user interface are easier for people to learn and use than current manual methods which tend to involve multiple open windows and cutting and pasting of data from one window to another. The ability to add plugins to offer search services also makes the user interface much more useful than current systems which rely on cut and paste operations involving search results from a search engine (e.g., GOOGLE®) in a separate window from the user interface.

Thanks to networking technologies, such as the Internet, and to document management systems, such as XEROX® DOCUSHARE® from Xerox Corporation of Norwalk, Conn., it is becoming increasingly common for documents to include links to subdocuments from multiple sources. Multiple subdocuments can be stitched together into a single aggregate document. This technique for constructing documents makes it possible to bring together large amounts of research into a final information-packed tome. One of the advantages of this technique is that the work of many authors can be leveraged to produce a completed text from existing work. For example, see U.S. Pat. App. Publication No. 2010/0241940 to Rao et al., filed Mar. 20, 2009, for additional information on trail-based data content discovery, organization, and processing. The '940 patent application provides a Xerox XEROX® implementation of trails that refers to pages or subdocuments of the whole as "markers." Metadata for each marker generally includes a name field, a tag field, and a description field. Marker metadata is stored in a database. Other implementations of aggregate documents are linear. However, a trail contains links that define a logical order in which markers should be read and printed that are not necessarily linear. In practice almost any type of document, including Word files, PDF files, ePub files, web pages, etc., can be a marker on a trail.

One of the advantages of a trail is that a visual map of the relationships can be built giving users a quick view of the high level structure of the aggregate document and the possible pathways that trail consumers can take through the document to discover information about the corresponding topic.

With reference to FIG. 1, an exemplary trail map view of an exemplary aggregate document shows a visual map of the trail formed by the aggregated document. In the exemplary trail, each marker on the visual map represents a web page. Consumers can "walk" through the trail (i.e., visual map) from one marker to another using a browser. In a trail-walking interface (not shown), navigational links (represented by arrows on the visual map) to the subdocuments are displayed above the content of each marker. For example, a single click can take the trail consumer to the sub document for the next marker on the map. The hierarchy of subdocuments in the visual map also determines the sequence of pages when the trail is prepared for printing. In general, markers toward the top (i.e., closer to a root node) will be printed before those at the bottom (i.e., at end nodes of branches along the trail).

For an example of techniques for generating aggregate documents, see U.S. Pat. App. Publication No. 2010/0241951 to Vandervort et al., filed Mar. 20, 2009. The '951 patent application describes a document generator that uses a computing system with one or more computing devices to generate a formatted document associated with a collection of data page units. The document generator may include a collector, an organization unit, and a formatting unit. The collector facilitates collecting data page units in response to a user selection. The data page units are collected intact and in their original format and are associated with an ordered sequence. The organization unit facilitates re-sequencing the data page units to associate the data page units with a desired ordered sequence. The formatting unit facilitates outputting a formatted document incorporating the collected data page units in the desired ordered sequence.

Figure 2:
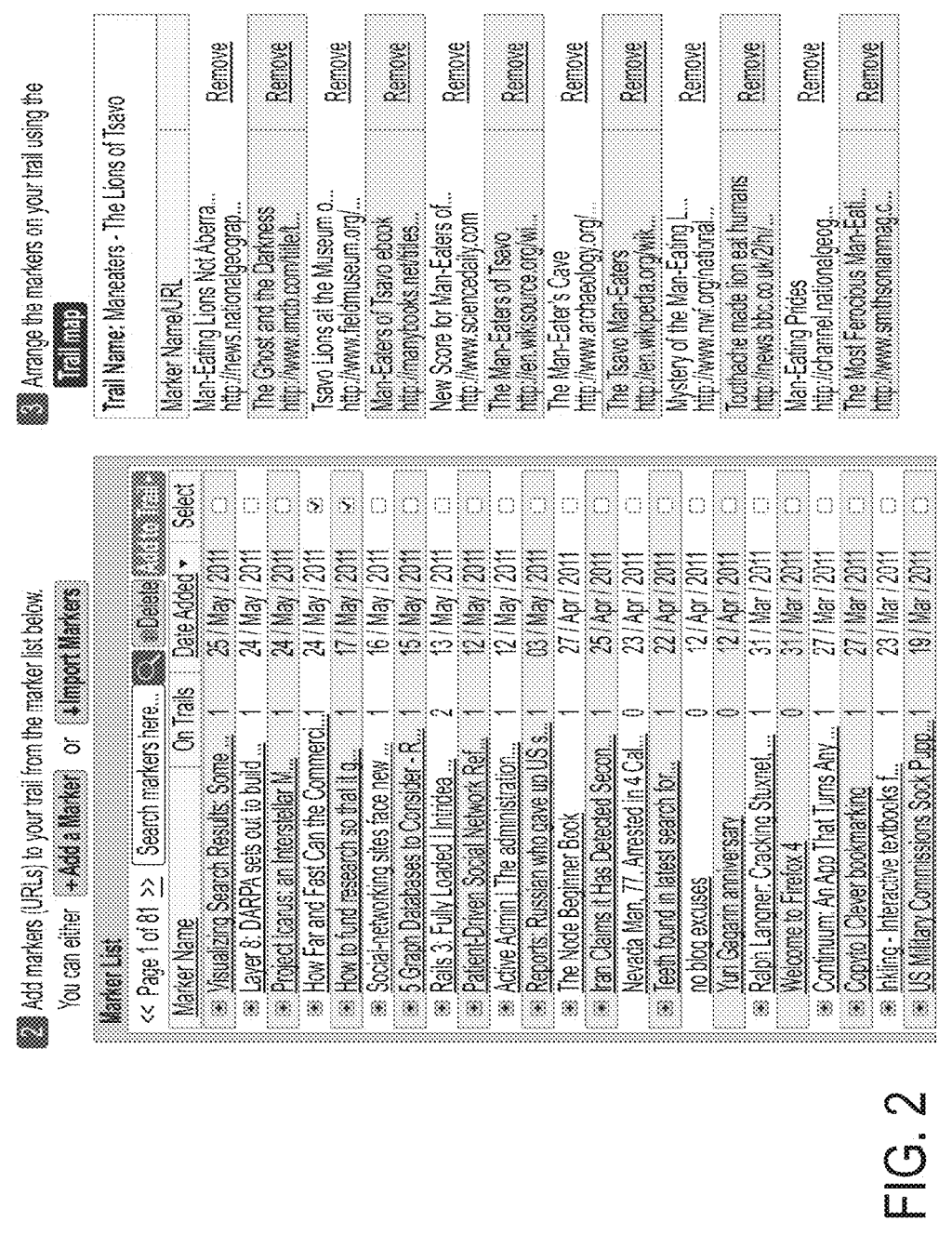

With reference to FIG. 2, an exemplary display screen for management of an aggregate document shows an embedded marker list service with a marker pool of available markers that can be viewed as a marker list. There are several techniques for adding markers to a trail. One technique is to import bookmarks (or favorites) from a browser. This technique typically requires that users export the bookmarks from the browser to create a bookmarks. The bookmarks file can be imported into the marker pool by activating an "import markers" control. Markers can be selected from the marker list by activating a check box. Selected markers can be added to a trail by activating an "add to trail" control. The exporting of bookmarks can be cumbersome because users may have hundreds, if not thousands, of browser bookmarks. If a user does not wish to import all of the browser bookmarks, they must ensure the bookmarks file that is uploaded only includes those browser markers that are desired for trails. Otherwise, the marker pool (i.e., marker list) is so large that it is barely manageable even if the marker pool includes a search function (see "Search markers here" field) for filtering the marker list. The total process of exporting bookmarks to use in a trail can be so time consuming and complex that users may never use the function.

Another technique for adding markers to a trail is to manually enter or copy and paste the URL from another source. For example, the URL can be copied from the navigation bar of a browser and pasted into a marker list for a trail. However, this is a slow and somewhat error prone process. Also, because of the added effort of manual entry, users frequently leave out metadata, such as a description or tags, for the marker.

It is also possible to add markers to a trail through a trails toolbar plugin for a browser or through a trails bookmarklet plugin for a bookmarks toolbar in the browser. These plugins allow users to add markers by simply clicking a button on the corresponding toolbar of the browser to add the current URL to a trail of their choice. While extremely easy, even for the most technology challenged users, this technique relies on JAVASCRIPT® code to work and is prone to unpredictable failures when there is a conflict between the JAVASCRIPT® in the toolbar/bookmarklet and the web page that a user is attempting to add. JAVASCRIPT® is a registered trademark of Oracle America, Inc., Redwood Shores, Calif. This technique is also restricted to adding web pages. Plans to allow enterprise customers (who might run a version of the application independent of the current website) to upload their own documents or directly enter text become much more complicated if they must be enabled and maintained on the browser (i.e., trails toolbar and/or trails bookmarklet plugins) as well as within the trails management system.

Another technique used to create a trail on a particular topic is to enter relevant keywords in a search engine (e.g., GOOGLE®), open some of the search results, and copy and paste the URLs from the browser navigation bar in an "add marker" window of the trails management system. Using the trails toolbar or trails bookmarklet plugins described above can save cutting and pasting the URL, but adds extra steps to choose a desired trail from a list of available trails. The extra steps make this process prone to errors that may result in the marker being added to the wrong trail or to none at all. If the technology is to become useful in enterprise markets, such as health care and legal services, users will need simpler ways to build trails.

The various techniques for managing an aggregate document described herein use a trail creation hub to provide an easier and more organized approach that combines creation and several methods of adding markers into a single, easy to use and highly configurable interface.

Figure 3:
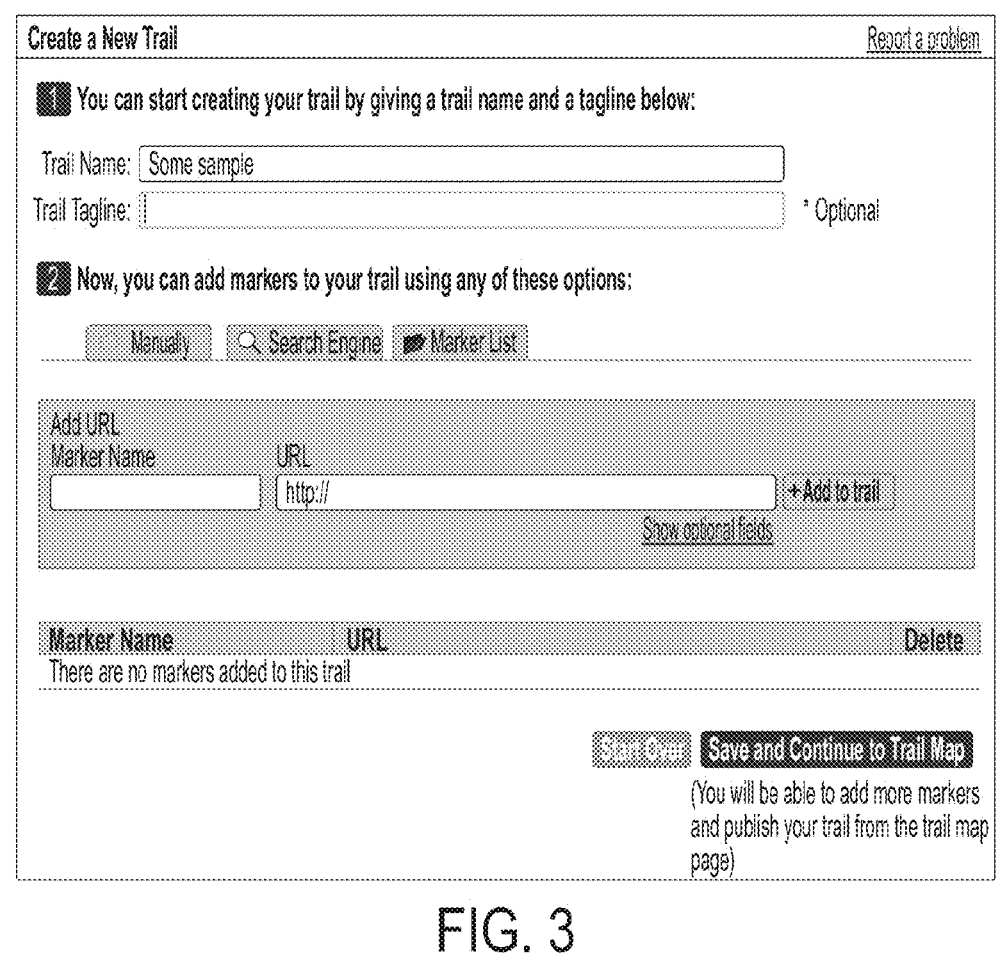

With reference to FIG. 3, an exemplary display screen for management of an aggregate document using an embedded manual service shows how the embedded manual service may be one of a plurality of choices of embedded services offered via a trail creation (or management) hub. The exemplary display screen shows a basic view of the interface. It includes fields at the top where the name and a tagline can be entered for the trail. Below this, the display screen includes tabs allowing users to access different ways of adding markers. The "Manually," "Search Engine," and "Marker List" techniques for adding markers are shown. Others techniques are planned and more are possible. The manual entry technique for adding markers allows users to type or paste in a URL and some descriptive data.

Figure 4:
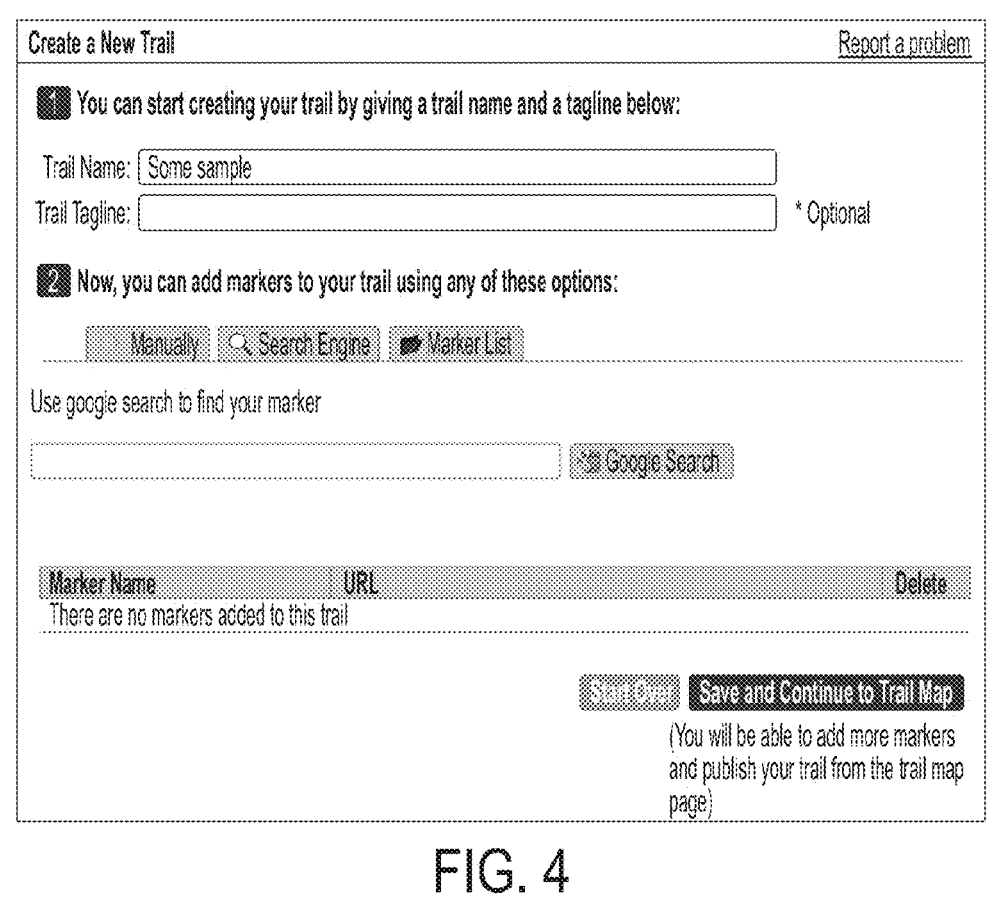

With reference to FIG. 4, an exemplary display screen for management of an aggregate document using an embedded search service shows how the embedded search service may be one of a plurality of choices of embedded services offered via a trail creation (or management) hub. As for the search service technique, although a GOOGLE® search service is shown, the architecture supports the ability for users or administrators to choose from any of a variety of publicly available search services, such as BING®, at DOGPILE®, DIGG®, DIIGO® and DELICIOUS®. DOGPILE® is a registered trademark of Infospace, Inc., Bellevue, Wash. DIGG® is a registered trademark of Digg, Inc., San Francisco, Calif. DIIGO® is a registered trademark of Diigo, Inc., Reno, Nev. DELICIOUS® is a registered trademark of AVOS Systems, Inc., San Mateo, Calif. For example, this allows the system to be configured for individual users or enterprise needs.

Figure 5:
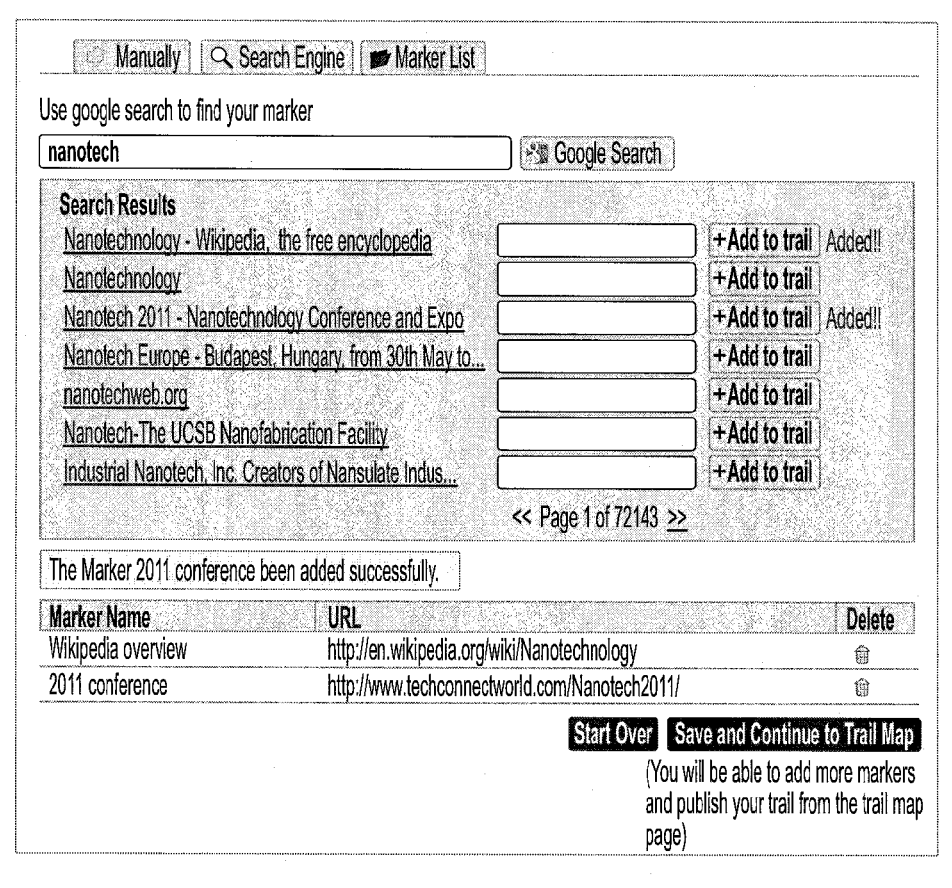

With reference to FIG. 5, another exemplary display screen for management of an aggregate document using an embedded search service shows a search result list added to the display screen after a search was performed by a search engine.

Figure 6:
FIG. 6 is another exemplary display screen for management of an aggregate document using an embedded marker list service.

With reference to FIG. 6, another exemplary display screen for management of an aggregate document using an embedded marker list service shows how the embedded search service may be one of a plurality of choices of embedded services offered via a trail creation (or management) hub. As for the marker list service, this function integrates the ability to access and manage a personal selection of markers along with multiple ways to create new markers and streamlines the process of building a trail. This not only makes it easier for users to learn how to work with this technology, but reduces the number of locations where users need to look for different functions by centrally locating the functions in the trail creation hub.

The trail creation hub functions are only examples of embedded services that can be used to add subdocuments (i.e., media content resources) to the trail defined by the aggregate document. Many more functions are possible and envisioned for the trail creation hub.

For example, with reference to FIGS. 5 and 6, below the tabs of the trail creation hub, is the list of markers that have been added to the trail. Markers in this list can be edited or removed. This shows users a linear view of the trail they are creating, at least for the current management session.

The combined interface at the trail creation hub is more than merely a convenient placement of options. Not all options are equally useful for all users. For example, GOOGLE® may not be the preferred search service for some users. For business users there may be firewall and policy issues with using services like DIGG® or REDDIT® to discover markers. REDDIT® is a registered trademark of Reddit, Inc., New York, N.Y. Various embodiments described herein for managing an aggregate document file address these issues by allowing individual users and/or system administrators (depending on implementation) to configure the embedded services that can be used to add markers. This includes changing search services, even writing new plugins for services that are not supported (possibly because they do not yet exist), as well as adding and removing tabs for marker adding methods. Therefore, if in the trail creation hub does not include a certain type of embedded service or a specific embedded service that is desired, the desired embedded service can be added later. A control can also be added to turn off the added embedded service for customers who do not want the service (or to turn on the added embedded service for customers that do want the service). The exact method of configuration may be from an administration console within the application, or by changing a flag in a database, or in a text file or any other method needed for a particular implementation. Of course the configuration management features are optional. Absence of the configuration management features merely leaves a static configuration. However, any suitable combinations of embedded services can be presented in a static configuration.

An example use case is provided to explain how the various features described herein could be used in an exemplary scenario. A user (e.g., Alice) wishes to create a trail containing information about XEROX® technology. She takes the following steps: 1) Opening the trail creation hub, Alice enters the trail name "Tech at Xerox." The trail is automatically created and named; 2) Alice clicks the manual entry tab and enters the URL http://open.xerox.com; 3) Alice clicks the search tab, choosing GOOGLE® as the current search engine, searches for the terms "Xerox" and "Innovation;" 4) Not liking the results, Alice clicks the "Choose your services" button (i.e., activates a configuration management feature) and adds the Wolfram Alpha WOLFRAM ALPHA® search service as another embedded search service. WOLFRAM ALPHA® is a registered trademark of Wolfram Group, LLC, Champaign, Ill. She is prompted for her credentials and signs in to the WOLFRAM ALPHA® search service from the trail creation hub; 5) Alice repeats the search using the added embedded search engine; 6) Paging through some of the hundreds of results, Alice selects ten likely markers, names each selected marker, and adds them to the marker list with a few clicks; and 7) Alice clicks "Save and continue to trail map." The next page Alice sees is a trail map view (similar to FIG. 1) showing the Open Xerox web site with arrows leading to the other markers arrayed around it.

Using current methods, creating this exemplary "Tech at Xerox" trail would require multiple browser windows. One for the GOOGLE® search, another for WOLFRAM ALPHA®, and another for the trail creation hub. The current methods would entail several minutes of copying and pasting and several more minutes of manually arranging the markers and creating links between them on the map. Using the trail creation hub significantly cuts the time to create the trail.

Markers can be added to existing trails through the trail creation hub in the same manner as described for creating a trail. This makes the process of editing across multiple sessions (or by multiple users) much simpler than currently possible.

Other products and services in the aggregate document, such as DIGG®, REDDIT® and DIIGO®, do not have a centralized location for presenting a plurality of different embedded services for creating markers, like the trail creation hub.

The trail creation hub makes trail creation easier to learn, easier to do and also more adaptable to customer needs. For example, the ability to configure possible marker sources opens up the possibility of tailoring a system to the needs of specific enterprises and market verticals that may use specialized search engines, such as LEXIS® Legal Search or MEDLINE PLUS® (a medical search engine). MEDLINE PLUS® is a registered trademark of National Library of Medicine, Bethesda, Md. The trail creation hub is particularly useful to the usability of trails for enterprise customers. Trails technology is a powerful platform for organizing documents and for sharing information that has been chosen for its value (as opposed to the lists of possibly unrelated material generated by an average search engine). The trail creation hub helps move this technology from an interesting way to consume data, to an accessible way for users to organize data from disparate sources into a coherent aggregate document.

Figure 8:
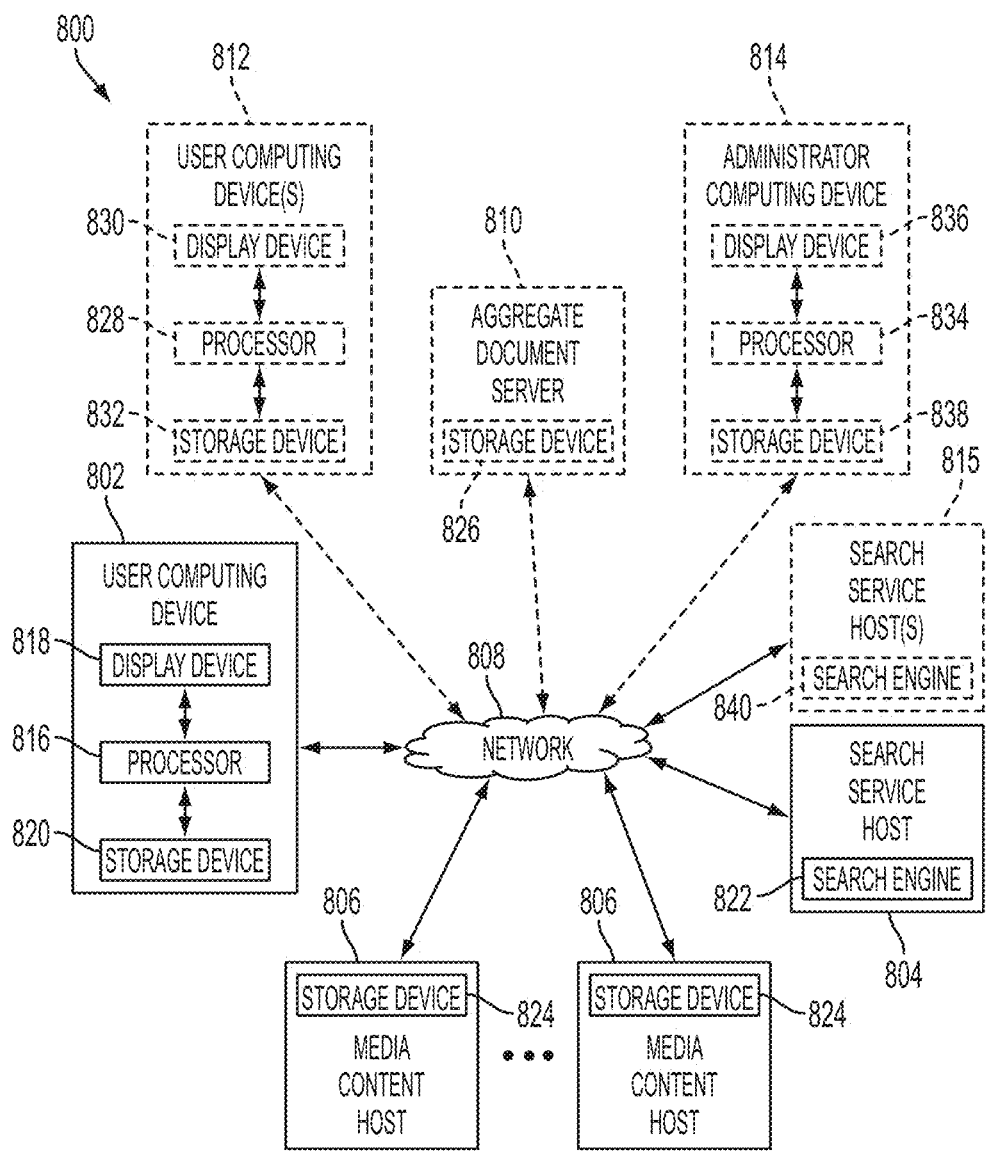
FIG. 8 is a block diagram of an exemplary embodiment of a system for managing an aggregate document.

With reference to FIG. 8, an exemplary embodiment of a system 800 for managing an aggregate document includes a user computing device 802, a search service host 804, and a plurality of media content hosts 806 in operative communication via a network 808. The system 800 may also include an aggregate document server 810, additional user computing devices 812, an administrator computer device 814, and additional search service hosts 815, in any suitable combination, in operative communication via the network 808.

The user computing device 802 includes a processor 816 in operative communication with a display device 818 and a storage device 820 and is suitable for operation by a user to manage an aggregate document. The storage device 820 is adapted to store program instructions for the processor 816 and data associated with operation of the user computing device 802. For example, the storage device 820 may store aggregate documents created or managed using the user computing device 802.

The search service host 804 includes a search engine 822 and computer equipment suitable to operate the search engine 822 to search the media content hosts 806 for media content resources in response to remote search queries from the user computing device 802 and additional user computing devices 812. Each media host 806 includes a storage device 824 for storage of media content resources. The network 808 may include any suitable type of communication network or multiple types of communication networks in any suitable combination, including any suitable wired and wireless networks. The aggregate document server 810 includes a storage device 826 adapted to store aggregate documents created or managed by the user computing device 802 and additional user computing devices 812.

Each additional user computing device 812 includes a processor 828 in operative communication with a display device 830 and a storage device 832 and is suitable for operation by a user to manage an aggregate document. The storage device 832 is adapted to store program instructions for the processor 828 and data associated with operation of the additional user computing device 812. For example, the storage device 832 may store aggregate documents created or managed using the additional user computing device 812.

The administrator computing device 814 includes a processor 834 in operative communication with a display device 836 and a storage device 838 and is suitable for operation by an administrator to manage the system 800, including configuring and reconfiguring embedded services available in the user computing device 802 and additional user computing devices 812 for creating or managing aggregate documents. Each additional search service host 815 includes a search engine 840 and computer equipment suitable to operate the search engine 840 to search the media content hosts 806 for media content resources in response to remote search queries from the user computing device 802 and additional user computing devices 812.

Figure 9:
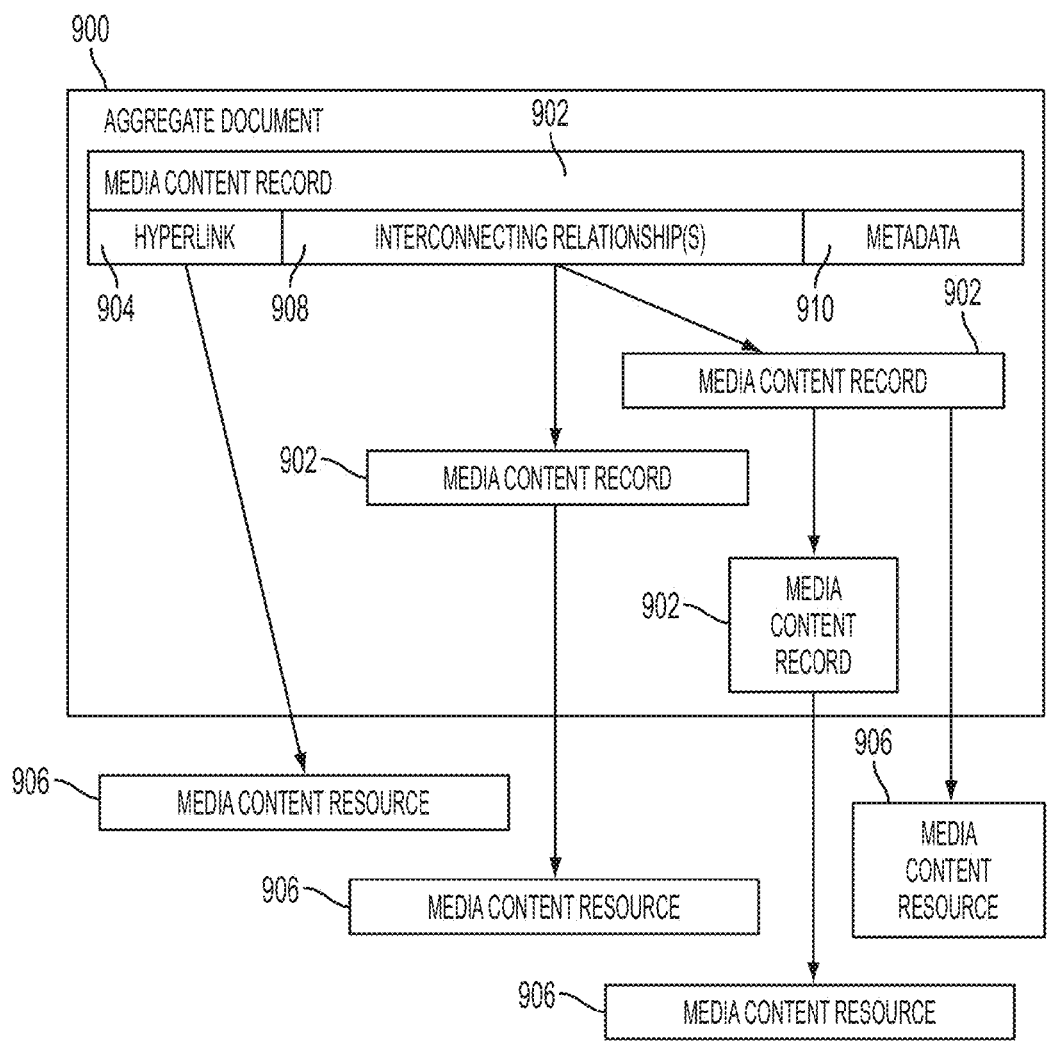
FIG. 9 is a functional diagram of an exemplary aggregate document.

With reference to FIG. 9, an exemplary aggregate document 900 includes a plurality of media content records 902. Each media content record 902 includes a hyperlink 904 to a media content resource 906. The plurality of media content records 902 includes interconnecting relationships 908 that form a trail with one or more branches (i.e., paths). Media content records 902 may also include metadata 910 associated with the corresponding media content resource 906. The metadata 910 associated with a given media content resource 906 may include a short name, a long name, a description, a tag, one or more keywords, and other suitable metadata in any suitable combination.

Figure 10:
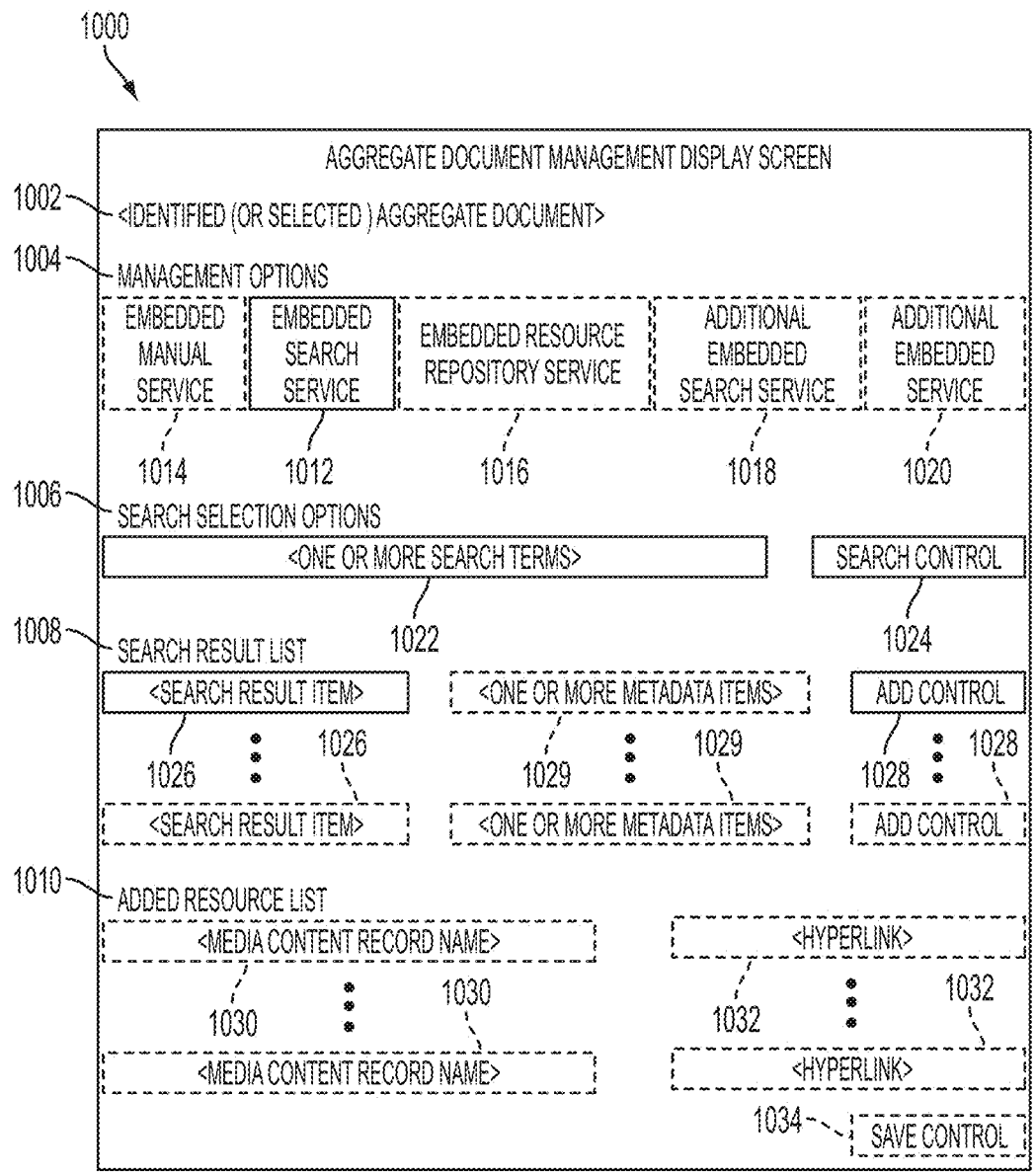
FIG. 10 is a functional diagram of an exemplary display screen for management of an aggregate document using an embedded search service.
Figure 11:
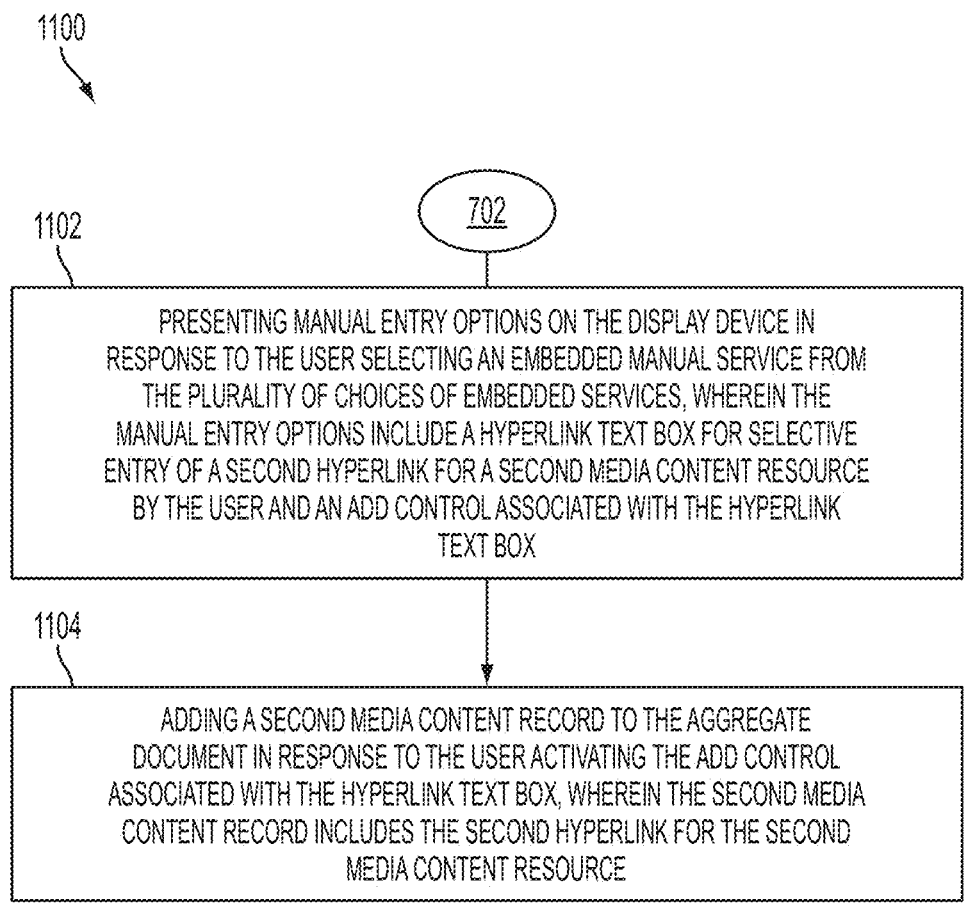
FIG. 11, in combination with FIG. 7, is a flowchart of an exemplary embodiment of a process for managing an aggregate document using an embedded manual service.

With reference to FIG. 10, an exemplary display screen 1000 for management of an aggregate document using an embedded search service includes a portion for identification or selection of an aggregate document 1002, management options 1004, search selection options 1006, a search result list 1008, and an added resource list 1010. The management options 1004 include an embedded search service 1012. The management options 1004 may also include an embedded manual service 1014, an embedded resource repository service 1016, an additional embedded search service 1018, and an additional embedded service 1020. The search selection options 1006 include a search text box 1022 and a search control 1024. The search result list 1008 include a plurality of search result items 1026 and an add control 1028 associated with each search result item 1026. Each search result item 1026 may also include a metadata text box 1029. The added resource list 1010 identifies media content records added to the aggregate document using the embedded search service 1012. The added resource list 1010 may identify each record by media content record name 1030 and hyperlink 1032. The added resource list 1010 may also include a save control 1034 to save the aggregate document with media content records added using the embedded search service 1012.

With reference to FIG. 7-10, an exemplary embodiment of a process 700 for managing an aggregate document 900 using an embedded search service 1012 begins at 702 where management options 1004 are presented on a display device 818 associated with a computing device 802 in response to a user using the computing device 802 to identify 1002 an aggregate document 900 to be created. The aggregate document 900 is adapted to store a plurality of media content records 902 and interconnecting relationships 908 that define a trail for navigating through a corresponding plurality of media content resources 906 using the interconnecting relationships 908 and hyperlinks 904 to the media content resources 906. The management options 1004 include a plurality of choices of embedded services for adding media content resources 906 to the trail defined by the aggregate document 900.

Next, at 704, search selection options 1006 are presented on the display device 818 in response to the user selecting a first embedded search service 1012 from the plurality of choices of embedded services. The search selection options 1006 include a search text box 1022 for selective entry of one or more search terms by the user and a search control 1024 for activation of a search by a first search engine 822 in relation to coinciding content of the search text box 1022. At 706, a search result list 1008 is presented on the display device 818 after the user entered one or more search terms in the search text box 1022 and activated the search control 1024 and in response to receiving search results from a corresponding search conducted by the first search engine 822. The search result list 1008 includes a plurality of search result items 1026 and an add control 1028 associated with each search result item 1026. Next, at 708, a first media content record 902 is added to the aggregate document 900 in response to the user activating the add control 1028 associated with a corresponding first search result item 1026. The first media content record 902 includes a first hyperlink 904 for a first media content resource 906 corresponding to the first search result item 1026.

In another embodiment of the process 700, the search result list 1008 includes a metadata text box 1029 associated with each search result item 1026 for selective entry of one or more metadata items 910 for the corresponding search result item 1026 by the user. In this embodiment, the process 700 also includes adding a first metadata item 910 to the first media content record 906 after the user entered the first metadata item 910 in the metadata text box 1029 associated with the first search result item 1026 and in response to the user activating the add control 1028 associated with the first search result item 1026.

In yet another embodiment, the process 700 also includes presenting an added resource list 1010 on the display device 818 along with the search result list 1008 in response to the user activating the add control 1028 associated with the first search result item 1026. In this embodiment, the added resource list 1010 identifies 1030, 1032 the first media content record 902 and is adapted to identify 1030, 1032 all media content records 902 that are added to the aggregate document 900 from the search result list 1008. In a further embodiment of the process 700, the added resource list 1010 includes a save control 1034. In this embodiment, the process 700 also includes storing a revised version of the aggregate document 900 in a storage device 820, 826 accessible to the computing device 802 in response to the user activating the save control 1034. For example, the aggregate document 900 may be stored in a local storage device 820 associated with the computing device 802, a remote storage device 826 associated with an aggregate document server 810, or any suitable storage device accessible to the computer device 802.

In still another embodiment of the process 700, the management options 1004 are configurable by at least one of the user and a system administrator. In a further embodiment of the process 700, the management options 1004 are re-configured such that a second embedded search service 1018 is added to the plurality of choices of embedded services. The second embedded search service 1018 being associated with a second search engine 840. In another further embodiment of the process 700, the management options 1004 are re-configured such that the first embedded search service 1012 is removed from the plurality of choices of embedded services. In another further embodiment of the process 700, the management options 1004 are re-configured such that another type of embedded service 1020 is added to the plurality of choices of embedded services.

In still yet another embodiment of the process 700, the interconnecting relationships 908 associated with the plurality of media content records 902 are adapted to define two or more paths through the trail defined by the aggregate document 900.

Figure 12:
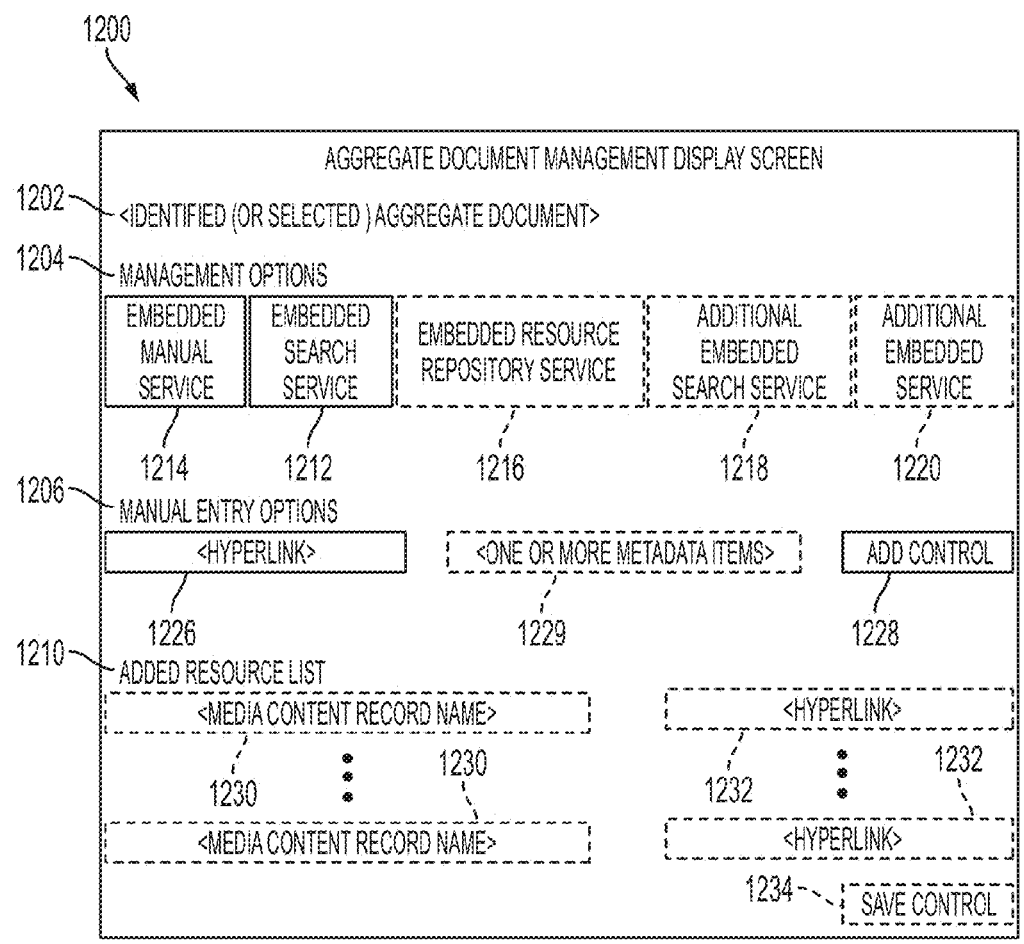
FIG. 12 is a functional diagram of an exemplary display screen for management of an aggregate document using an embedded manual service.
Figure 13:
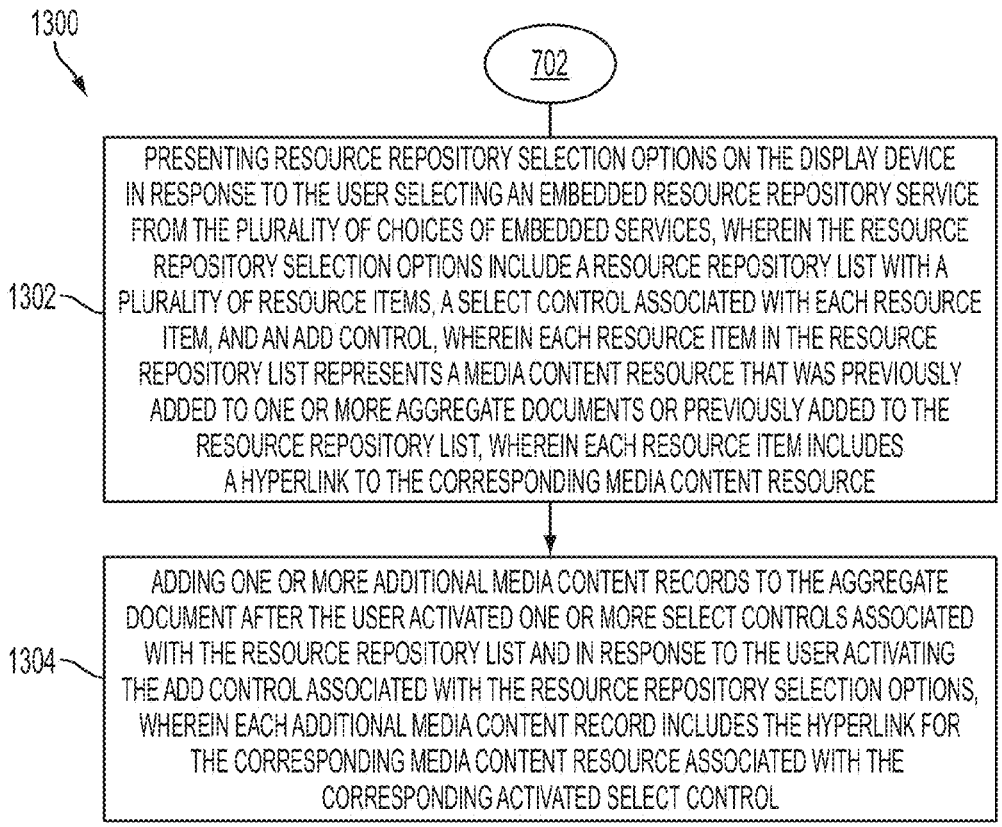
FIG. 13, in combination with FIG. 7, is a flowchart of an exemplary embodiment of a process for managing an aggregate document using an embedded resource repository service.

With reference to FIG. 12, an exemplary display screen 1200 for management of an aggregate document using an embedded manual service includes a portion for identification or selection of an aggregate document 1202, management options 1204, manual entry options 1206, and an added resource list 1210. The management options 1204 include an embedded search service 1212 and an embedded manual service 1214. The management options 1204 may also include an embedded resource repository service 1216, an additional embedded search service 1218, and an additional embedded service 1220. The manual entry options 1206 include a hyperlink text box 1226 and an add control 1228. The hyperlink text box 1226 may also be associated with a metadata text box 1229. The added resource list 1210 identifies media content records added to the aggregate document using the embedded manual service 1214. The added resource list 1210 may identify each record 902 by media content record name 1230 and hyperlink 1232. The added resource list 1210 may also include a save control 1234 to save the aggregate document with media content records added using the embedded manual service 1214.

Figure 7:
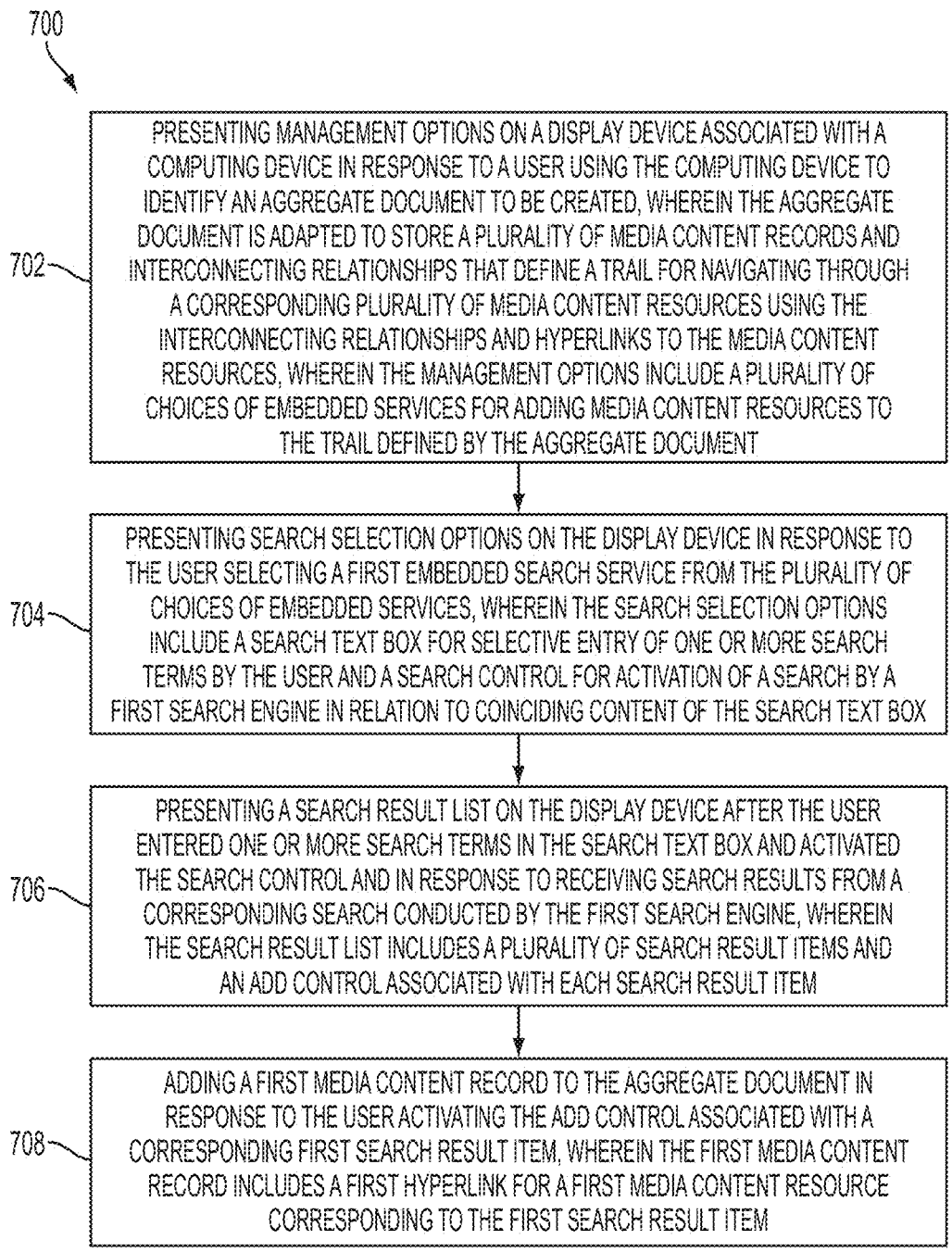
FIG. 7 is a flowchart of an exemplary embodiment of a process for managing an aggregate document using an embedded search service.

With reference to FIGS. 7-9, 11 and 12, an exemplary embodiment of a process 1100 for managing an aggregate document 900 using an embedded manual service 1214 includes 702 from the process 700 of FIG. 7 and continues at 1102 where manual entry options 1204 are presented on the display device 818 in response to the user selecting an embedded manual service 1214 from the plurality of choices of embedded services. The manual entry options 1206 include a hyperlink text box 1226 for selective entry of a second hyperlink 904 for a second media content resource 906 by the user and an add control 1228 associated with the hyperlink text box 1226. Next, at 1104, a second media content record 902 is added to the aggregate document 900 in response to the user activating the add control 1228 associated with the hyperlink text box 1226. The second media content record 902 includes the second hyperlink 904 for the second media content resource 906.

In another embodiment of the process 1100, the manual entry options 1206 include a metadata text box 1229 associated with the hyperlink text box 1226 for selective entry of one or more metadata items 910 for the corresponding hyperlink 904 by the user. In this embodiment, the process 1100 also includes adding a second metadata item 910 to the second media content record 906 after the user entered one or more metadata items 910 in the metadata text box 1229 associated with the hyperlink text box 1226 and in response to the user activating the add control 1228 associated with the hyperlink text box 1226.

In yet another embodiment, the process 1100 also includes presenting an added resource list 1210 on the display device 818 along with the manual entry options 1206 in response to the user activating the add control 1228 associated with the hyperlink text box 1226. The added resource list 1210 identifies 1230, 1232 the second media content record 902. In a further embodiment of the process 1100, the added resource list 1210 includes a save control 1234. In this embodiment, the process also includes storing a revised version of the aggregate document 900 in a storage device 820, 826 accessible to the computing device 802 in response to the user activating the save control 1234. For example, the aggregate document 900 may be stored in a local storage device 820 associated with the computing device 802, a remote storage device 826 associated with an aggregate document server 810, or any suitable storage device accessible to the computer device 802.

Figure 14:
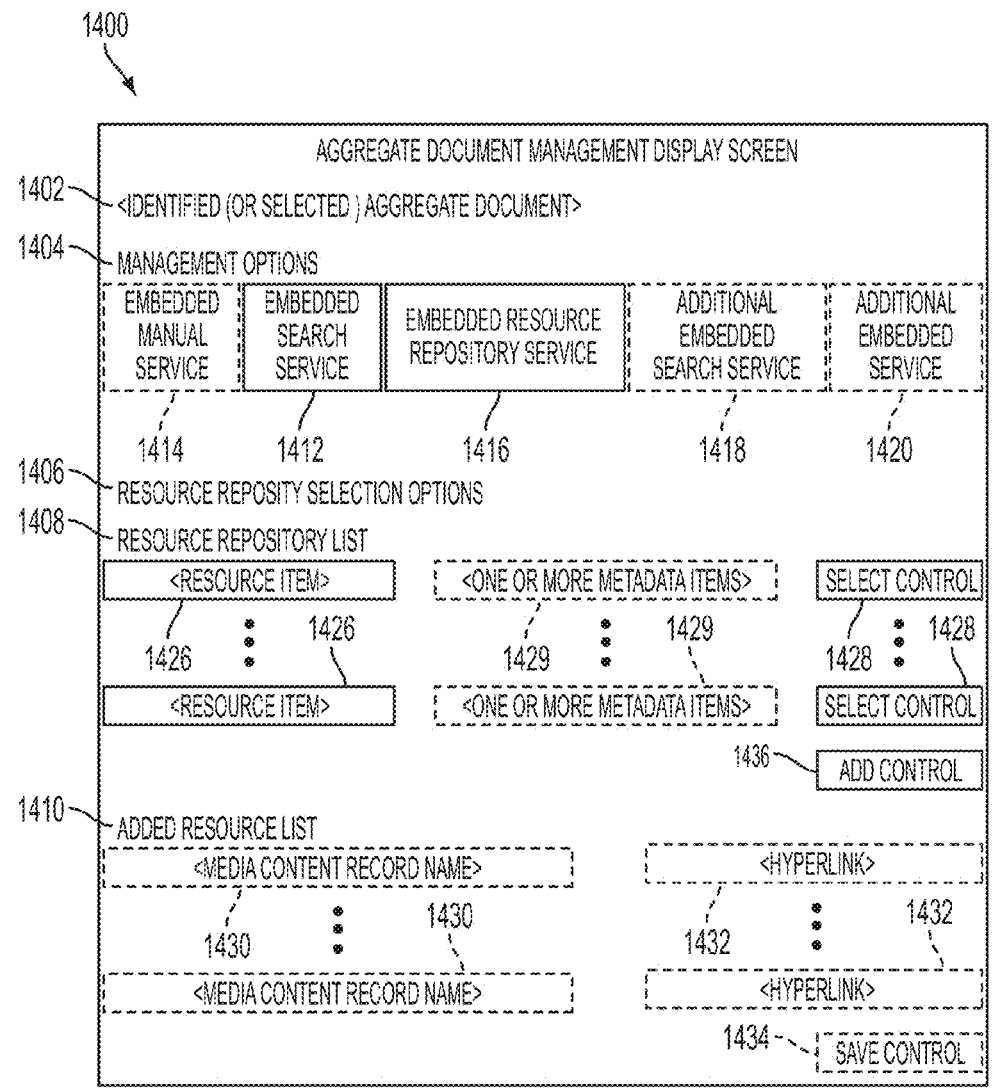
FIG. 14 is a functional diagram of an exemplary display screen for management of an aggregate document using an embedded resource repository service.

With reference to FIG. 14, an exemplary display screen 1400 for management of an aggregate document using an embedded resource repository service includes a portion for identification or selection of an aggregate document 1402, management options 1404, resource repository selection options 1406, and an added resource list 1410. The management options 1404 include an embedded search service 1412 and an embedded resource repository service 1416. The management options 1404 may also include an embedded manual service 1414, an additional embedded search service 1418, and an additional embedded service 1420. The resource repository selection options 1406 include a resource repository list 1408 with a plurality of resource items 1426, a select control 1428 associated with each resource item 1426, and an add control 1436 to add selected resource items 1426 to the aggregate document. Each resource item 1426 may also include a metadata text box 1429. The added resource list 1410 identifies media content records added to the aggregate document using the embedded resource repository service 1416. The added resource list 1410 may identify each record by media content record name 1430 and hyperlink 1432. The added resource list 1410 may also include a save control 1434 to save the aggregate document with media content records added using the embedded resource repository service 1416.

With reference to FIGS. 7-9, 13 and 14, an exemplary embodiment of a process 1300 for managing an aggregate document 900 using an embedded resource repository service 1416 includes 702 from the process 700 of FIG. 7 and continue at 1302 where resource repository selection options 1406 are presented on the display device 818 in response to the user selecting an embedded resource repository service 1416 from the plurality of choices of embedded services. The resource repository selection options 1406 include a resource repository list 1408 with a plurality of resource items 1426, a select control 1428 associated with each resource item 1426, and an add control 1436. Each resource item 1426 in the resource repository list 1408 represents a media content resource 906 that was previously added to one or more aggregate documents 900 or previously added to the resource repository list 1408. Each resource item 1426 includes a hyperlink 904 to the corresponding media content resource 906. Next, at 1304, one or more additional media content records 902 are added to the aggregate document 900 after the user activated one or more select controls 1428 associated with the resource repository list 1408 and in response to the user activating the add control 1436 associated with the resource repository selection options 1406. Each additional media content record 902 includes the hyperlink 904 for the corresponding media content resource 906 associated with the corresponding activated select control 1428.

In another embodiment, the process 1300 also includes presenting an added resource list 1410 on the display device 818 along with the resource repository selection options 1406 in response to the user activating the add control 1436 associated with the resource repository selection options 1406. The added resource list 1410 identifies the one or more additional media content records 902 and is adapted to identify all media content records 902 that are added to the aggregate document 900 from the resource repository list 1408. In a further embodiment of the process 1300, the added resource list 1410 includes a save control 1434. In this embodiment, the process 1300 also includes storing a revised version of the aggregate document 900 in a storage device 820, 826 accessible to the computing device 802 in response to the user activating the save control 1434. For example, the aggregate document 900 may be stored in a local storage device 820 associated with the computing device 802, a remote storage device 826 associated with an aggregate document server 810, or any suitable storage device accessible to the computer device 802.

Figure 15:
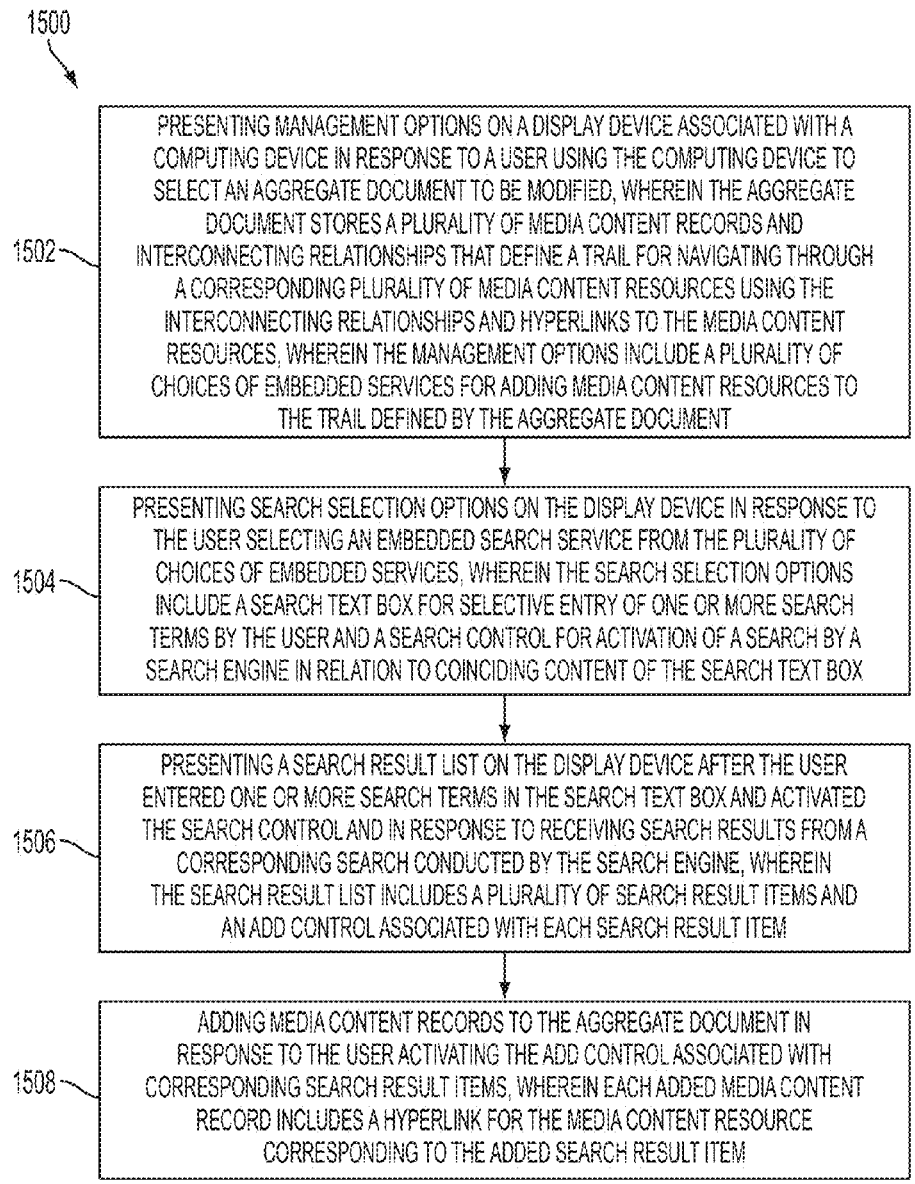
FIG. 15 is a flowchart of another exemplary embodiment of a process for managing an aggregate document using an embedded search service.

With reference to FIG. 15, another exemplary embodiment of a process 1500 for managing an aggregate document using an embedded search service begins at 1502 where management options are presented on a display device associated with a computing device in response to a user using the computing device to select an aggregate document to be modified. The aggregate document stores a plurality of media content records and interconnecting relationships that define a trail for navigating through a corresponding plurality of media content resources using the interconnecting relationships and hyperlinks to the media content resources. The management options include a plurality of choices of embedded services for adding media content resources to the trail defined by the aggregate document.

Next, at 1504, search selection options are presented on the display device in response to the user selecting an embedded search service from the plurality of choices of embedded services. The search selection options include a search text box for selective entry of one or more search terms by the user and a search control for activation of a search by a search engine in relation to coinciding content of the search text box. At 1506, a search result list is presented on the display device after the user entered one or more search terms in the search text box and activated the search control and in response to receiving search results from a corresponding search conducted by the search engine. The search result list includes a plurality of search result items and an add control associated with each search result item. Next, at 1508, media content records are added to the aggregate document in response to the user activating the add control associated with corresponding search result items. Each added media content record includes a hyperlink for the media content resource corresponding to the added search result item.

In another embodiment of the process 1500, the search result list includes a metadata text box associated with each search result item for selective entry of a name metadata item for the corresponding search result item by the user. In this embodiment, the process 1500 also includes adding name metadata items to the media content records after the user entered the name metadata item in the metadata text box associated with the corresponding search result item and in response to the user activating the add control associated with the corresponding search result item.

In yet another embodiment of the process 1500, the management options are re-configurable by at least one of the user and a system administrator such that another embedded search service is added to the plurality of choices of embedded services, the added embedded search service being associated with a different search engine than the search engine associated with the existing embedded search service. In still another embodiment of the process 1500, the management options are re-configurable by at least one of the user and a system administrator such that the embedded search service is removed from the plurality of choices of embedded services. In still yet another embodiment of the process 1500, the management options are re-configurable by at least one of the user and a system administrator such that another type of embedded service is added to the plurality of choices of embedded services. In another embodiment of the process 1500, the interconnecting relationships associated with the plurality of media content records are adapted to define two or more paths through the trail defined by the aggregate document.

In yet another embodiment, the process 1500 also includes presenting manual entry options on the display device in response to the user selecting an embedded manual service from the plurality of choices of embedded services, wherein the manual entry options include a hyperlink text box for selective entry of a hyperlink for another media content resource by the user and an add control associated with the hyperlink text box. Next, another media content record is added to the aggregate document in response to the user activating the add control associated with the hyperlink text box. The another media content record includes the hyperlink for the another media content resource. In a further embodiment of the process 1500, the manual entry options include a metadata text box associated with the hyperlink text box for selective entry of a name metadata item for the corresponding hyperlink by the user. In this embodiment, the process 1500 also includes adding the name metadata item to the another media content record after the user entered the name metadata item in the metadata text box associated with the hyperlink text box and in response to the user activating the add control associated with the hyperlink text box.

In still yet another embodiment, the process 1500 also includes presenting resource repository selection options on the display device in response to the user selecting an embedded resource repository service from the plurality of choices of embedded services. The resource repository selection options include a resource repository list with a plurality of resource items, a select control associated with each resource item, and an add control. Each resource item in the resource repository list represents a media content resource that was previously added to one or more aggregate documents or previously added to the resource repository list. Each resource item includes a hyperlink to the corresponding media content resource. Next, additional media content records are added to the aggregate document after the user activated corresponding select controls associated with the resource repository list and in response to the user activating the add control associated with the resource repository selection options. Each additional media content record includes the hyperlink for the corresponding media content resource associated with the corresponding activated select control.

Figure 16:
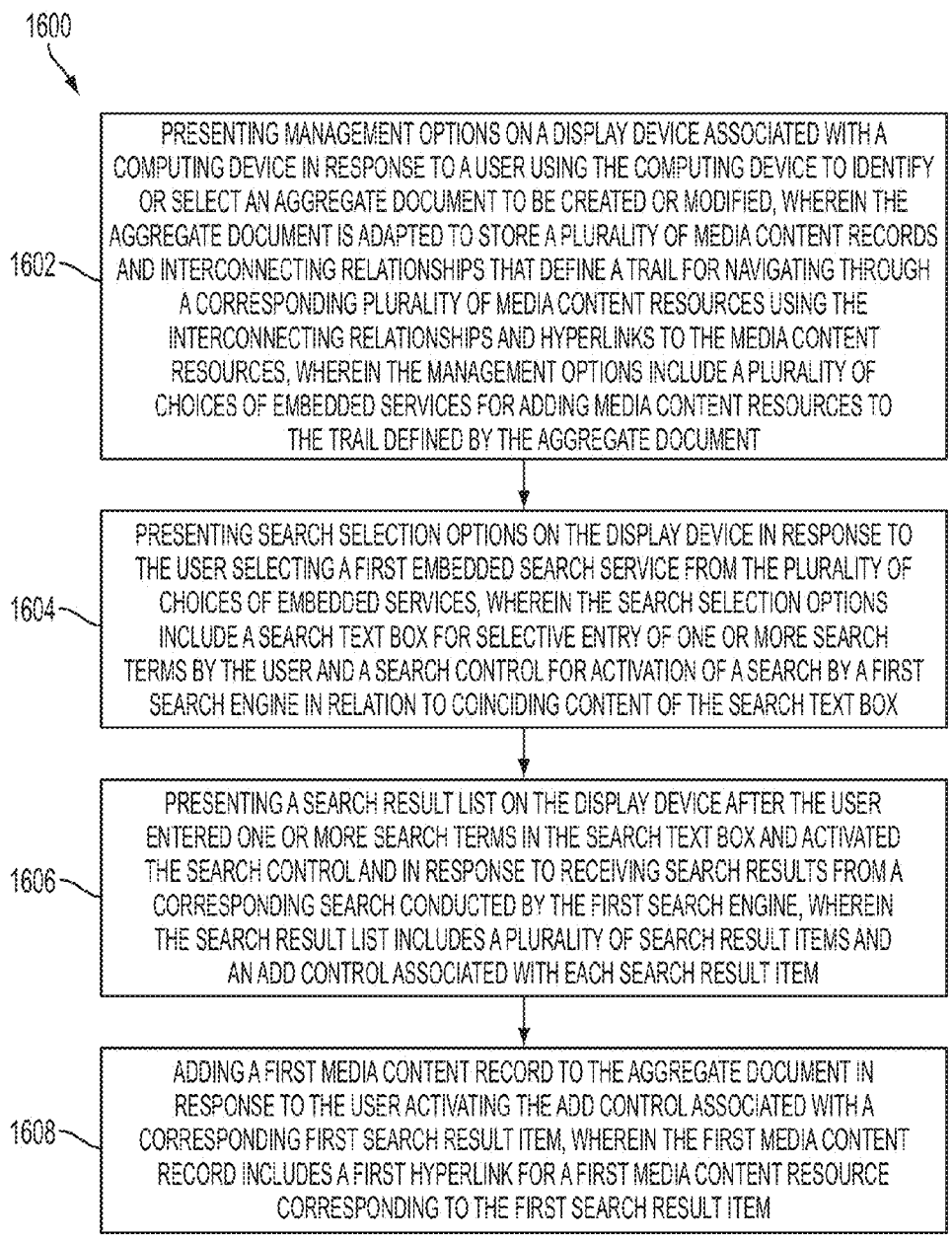
FIG. 16 is a flowchart of yet another exemplary embodiment of a process for managing an aggregate document using an embedded search service that is performed by a computer-controlled device executing program instructions stored on a non-transitory computer-readable medium.

With reference to FIG. 16, yet another exemplary embodiment of a process 1600 for managing an aggregate document using an embedded search service is performed by a computer-controlled device executing program instructions stored on a non-transitory computer-readable medium. The process 1600 begins at 1602 where management options are presented on a display device associated with a computing device in response to a user using the computing device to identify or select an aggregate document to be created or modified. The aggregate document is adapted to store a plurality of media content records and interconnecting relationships that define a trail for navigating through a corresponding plurality of media content resources using the interconnecting relationships and hyperlinks to the media content resources. The management options include a plurality of choices of embedded services for adding media content resources to the trail defined by the aggregate document.

Next, at 1604, search selection options are presented on the display device in response to the user selecting a first embedded search service from the plurality of choices of embedded services. The search selection options include a search text box for selective entry of one or more search terms by the user and a search control for activation of a search by a first search engine in relation to coinciding content of the search text box. At 1606, a search result list is presented on the display device after the user entered one or more search terms in the search text box and activated the search control and in response to receiving search results from a corresponding search conducted by the first search engine. The search result list includes a plurality of search result items and an add control associated with each search result item. Next, at 1608, a first media content record is added to the aggregate document in response to the user activating the add control associated with a corresponding first search result item. The first media content record includes a first hyperlink for a first media content resource corresponding to the first search result item.

In another embodiment, the process 1600 also includes presenting manual entry options on the display device in response to the user selecting an embedded manual service from the plurality of choices of embedded services. The manual entry options include a hyperlink text box for selective entry of a second hyperlink for a second media content resource by the user and an add control associated with the hyperlink text box. Next, a second media content record is added to the aggregate document in response to the user activating the add control associated with the hyperlink text box. The second media content record includes the second hyperlink for the second media content resource.

In yet another embodiment, the process 1600 also includes presenting resource repository selection options on the display device in response to the user selecting an embedded resource repository service from the plurality of choices of embedded services. The resource repository selection options include a resource repository list with a plurality of resource items, a select control associated with each resource item, and an add control. Each resource item in the resource repository list represents a media content resource that was previously added to one or more aggregate documents or previously added to the resource repository list 1408. Each resource item includes a hyperlink to the corresponding media content resource. Next, one or more additional media content records is added to the aggregate document after the user activated one or more select controls associated with the resource repository list and in response to the user activating the add control associated with the resource repository selection options. Each additional media content record includes the hyperlink for the corresponding media content resource associated with the corresponding activated select control.

In various embodiments, the program instructions stored in the non-transitory computer-readable memory, when executed by the computer, may cause the computer-controlled device to perform various combinations of functions associated with the various embodiments of the processes 700, 1100, 1300, 1500 for managing an aggregate document described above with reference to FIGS. 7, 11, 13, and 15. In other words, the various embodiments of the processes 700, 1100, 1300, 1500 described above may also be implemented by corresponding embodiments of the process 1600 associated with the program instructions stored in the non-transitory computer-readable memory.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of managing an aggregate document, comprising:
   a) presenting a user interface screen on a display device associated with a computing device in response to a user using the computing device to identify or select an aggregate document to be created or modified, wherein the aggregate document is configured to store a plurality of media content records and interconnecting relationships that define a trail for navigating through a corresponding plurality of media content resources using the interconnecting relationships and hyperlinks to the corresponding media content resources, wherein the user interface screen includes management options for selection of a plurality of embedded services to add one or more media content resources to the trail defined by the aggregate document, wherein the plurality of embedded services include a first embedded search service associated with a first search engine, an embedded manual service, and an embedded resource repository service;

b) presenting select embedded service options in the user interface screen on the display device in response to the user selecting a first management option identifying a first embedded service from the plurality of embedded services and subsequently activating of the first embedded service, wherein the select embedded service options include at least one add control associated with the one or more media content resources identified using the first embedded service; and c) adding one or more media content record and the corresponding hyperlink(s) to the aggregate document in response to the user activating the at least one add control, wherein the one or more media content record corresponds to the one or more media content resources.

2. The method of claim 1, wherein the first embedded service comprises the first embedded search service, wherein the select embedded service options include search selection options comprising a search text box for selective entry of one or more search terms by the user and a search control for activation of a search by the first search engine in relation to coinciding content of the search text box, the method further comprising:

presenting a search result list in the user interface screen on the display device after the user entered one or more search terms in the search text box and activated the search control and in response to receiving search results from a corresponding search conducted by the first search engine, wherein the search result list includes one or more search result items representing the corresponding one or more media content resources and corresponding to the one or more media content records, the search result list also including an add control associated with each search result item, the corresponding media content resource, and the corresponding media content record; and adding the media content record and the corresponding hyperlink to the aggregate document in response to the user activating the add control associated with the corresponding search result item.

3. The method of claim 2, wherein the search result list includes a metadata text box associated with each search result item for selective entry of one or more metadata items for the corresponding search result item by the user, the method further comprising:

adding at least one metadata item to at least one media content record after the user entered the corresponding metadata item(s) in the metadata text box associated with the corresponding search result item and in response to the user activating the add control associated with the corresponding search result item.

4. The method of claim 1, further comprising:
presenting an added resource list in the user interface screen on the display device along with the select embedded service options in response to the user activating the at least one add control associated with the select embedded service options, wherein the added resource list is configured to identify media content records that are added to the aggregate document via the plurality of embedded services.

5. The method of claim 1, wherein the management options are configurable by at least one of the user and a system administrator.

6. The method of claim 5, further comprising:
reconfiguring the management options in response to at least one of user and system administrator action such that a second embedded search service is added to the plurality of embedded services, the second embedded search service being associated with a second search engine.

7. The method of claim 5, further comprising:
reconfiguring the management options in response to at least one of user and system administrator action such that at least one of the first embedded search service, embedded manual service, and embedded resource repository service is removed from the plurality of choices of embedded services.

8. The method of claim 5, further comprising:
reconfiguring the management options in response to at least one of user and system administrator action such that another type of embedded service is added to the plurality of embedded services.

9. The method of claim 1, wherein the first embedded service comprises the embedded manual service, wherein the select embedded service options include manual entry options comprising a hyperlink text box for selective entry of the hyperlink for the corresponding media content resource by the user and an add control associated with the hyperlink text box, the method further comprising:

adding the corresponding media content record and the corresponding hyperlink to the aggregate document in response to the user activating the add control associated with the hyperlink text box.

10. The method of claim 9, wherein the manual entry options include a metadata text box associated with the hyperlink text box for selective entry of one or more metadata items for the corresponding hyperlink by the user, the method further comprising:

adding at least one metadata item to the corresponding media content record after the user entered the corresponding metadata item(s) in the metadata text box associated with the hyperlink text box and in response to the user activating the add control associated with the hyperlink text box.

11. The method of claim 1, wherein the first embedded service comprises the embedded resource repository service, wherein the select embedded service options include resource repository selection options comprising a resource repository list with a plurality of resource items, a select control associated with each resource item, and an add control, wherein each resource item in the resource repository list represents a media content resource that was previously added to one or more aggregate documents or previously added to the resource repository list, wherein each resource item includes a hyperlink to the corresponding media content resource, the method further comprising:

adding the corresponding media content record(s) and the corresponding hyperlink(s) to the aggregate document after the user activated one or more select controls associated with the resource repository list and in response to the user activating the add control associated with the resource repository selection options.

12. The method of claim 1, wherein the interconnecting relationships associated with the plurality of media content records are adapted to define two or more paths through the trail defined by the aggregate document.

13. A method of managing an aggregate document, comprising:

a) presenting a user interface screen on a display device associated with a computing device in response to a user using the computing device to identify or select an aggregate document to be created or modified, wherein the aggregate document is configured to store a plurality of media content records and interconnecting relationships that define a trail for navigating through a corresponding plurality of media content resources using the interconnecting relationships and hyperlinks to the corresponding media content resources, wherein the user interface screen includes management options for selection of a plurality of embedded services to add one or more media content resources to the trail defined by the aggregate document, wherein the plurality of embedded services include a first embedded search service associated with a first search engine, an embedded manual service, and an embedded resource repository service;

b) presenting search selection options in the user interface screen on the display device in response to the user selecting a first management option identifying the first embedded search service from the plurality of embedded services and subsequently activating of the first embedded search service, wherein the search selection options include a search text box for selective entry of one or more search terms by the user and a search control for activation of a search by the first search engine in relation to coinciding content of the search text box;

c) presenting a search result list in the user interface screen on the display device after the user entered one or more search terms in the search text box and activated the search control and in response to receiving search results from a corresponding search conducted by the first search engine, wherein the search result list includes one or more search result items representing a corresponding one or more media content resources and corresponding to the one or more media content records, the search result list also including an add control associated with each search result item, the corresponding media content resource, and the corresponding media content record; and d) adding the media content record and the corresponding hyperlink to the aggregate document in response to the user activating the add control associated with the corresponding search result item.

14. The method of claim 13, wherein the search result list includes a metadata text box associated with each search result item for selective entry of one or more metadata items for the corresponding search result item by the user, the method further comprising:
adding at least one metadata item to at least one media content record after the user entered the corresponding metadata item(s) in the metadata text box associated with the corresponding search result item and in response to the user activating the add control associated with the corresponding search result item.

15. The method of claim 13, further comprising:
presenting manual entry options in the user interface screen on the display device in response to the user selecting a second management option identifying the embedded manual service from the plurality of embedded services and subsequently activating the embedded manual service, wherein the manual entry options include a hyperlink text box for selective entry of the hyperlink for the corresponding media content resource by the user and an add control associated with the hyperlink text box; and
adding the corresponding media content record and the corresponding hyperlink to the aggregate document in response to the user activating the add control associated with the hyperlink text box.

16. The method of claim 15, wherein the manual entry options include a metadata text box associated with the hyperlink text box for selective entry of one or more metadata items for the corresponding hyperlink by the user, the method further comprising:
adding at least one metadata item to the corresponding media content record after the user entered the corresponding metadata item(s) in the metadata text box associated with the hyperlink text box and in response to the user activating the add control associated with the hyperlink text box.

17. The method of claim 13, further comprising:
presenting resource repository selection options in the user interface screen on the display device in response to the user selecting a second management option identifying the embedded resource repository service from the plurality of embedded services and subsequently activating the embedded resource repository service, wherein the resource repository selection options include a resource repository list with a plurality of resource items, a select control associated with each resource item, and an add control, wherein each resource item in the resource repository list represents a media content resource that was previously added to one or more aggregate documents or previously added to the resource repository list, wherein each resource item includes a hyperlink to the corresponding media content resource; and
adding the corresponding media content record(s) and the corresponding hyperlink(s) to the aggregate document after the user activated corresponding select controls associated with the resource repository list and in response to the user activating the add control associated with the resource repository selection options.

18. A non-transitory computer-readable medium storing program instructions that, when executed by a computer, cause a corresponding computer-controlled device to perform a method of managing an aggregate document, the method comprising:
a) presenting a user interface screen on a display device associated with a computing device in response to a user using the computing device to identify or select an aggregate document to be created or modified, wherein the aggregate document is configured to store a plurality of media content records and interconnecting relationships that define a trail for navigating through a corresponding plurality of media content resources using the interconnecting relationships and hyperlinks to the corresponding media content resources, wherein the user interface screen includes management options for selection of a plurality of embedded services to add one or more media content resources to the trail defined by the aggregate document, wherein the plurality of embedded services include a first embedded search service associated with a first search engine, an embedded manual service, and an embedded resource repository service;
b) presenting search selection options in the user interface screen on the display device in response to the user selecting a first management option identifying the first embedded search service from the plurality of embedded services and subsequently activating of the first embedded search service, wherein the search selection options include a search text box for selective entry of one or more search terms by the user and a search control for activation of a search by the first search engine in relation to coinciding content of the search text box;

c) presenting a search result list in the user interface screen on the display device after the user entered one or more search terms in the search text box and activated the search control and in response to receiving search results from a corresponding search conducted by the first search engine, wherein the search result list includes one or more search result items representing a corresponding one or more media content resources and corresponding to the one or more media content records, the search result list also including an add control associated with each search result item, the corresponding media content resource, and the corresponding media content record; and d) adding the media content record and the corresponding hyperlink to the aggregate document in response to the user activating the add control associated with the corresponding search result item.

19. The non-transitory computer-readable medium of claim 18, further comprising:

presenting manual entry options in the user interface screen on the display device in response to the user selecting a second management option identifying the embedded manual service from the plurality of embedded services and subsequently activating the embedded manual service, wherein the manual entry options include a hyperlink text box for selective entry of the hyperlink for the corresponding media content resource by the user and an add control associated with the hyperlink text box; and adding the corresponding media content record and the corresponding hyperlink to the aggregate document in response to the user activating the add control associated with the hyperlink text box.

20. The non-transitory computer-readable medium of claim 19, further comprising:

presenting resource repository selection options in the user interface screen on the display device in response to the user selecting a third management option identifying the embedded resource repository service from the plurality of embedded services and subsequently activating the embedded resource repository service, wherein the resource repository selection options include a resource repository list with a plurality of resource items, a select control associated with each resource item, and an add control, wherein each resource item in the resource repository list represents a media content resource that was previously added to one or more aggregate documents or previously added to the resource repository list, wherein each resource item includes a hyperlink to the corresponding media content resource; and adding the corresponding media content records and the corresponding hyperlinks to the aggregate document after the user activated corresponding select controls associated with the resource repository list and in response to the user activating the add control associated with the resource repository selection options.

\* \* \* \* \*